F. D. WILSON.
SHEAF CARRIER.
APPLICATION FILED DEC. 5, 1916.
1,281,464.
Patented Oct. 15, 1918.
3 SHEETS—SHEET 1.
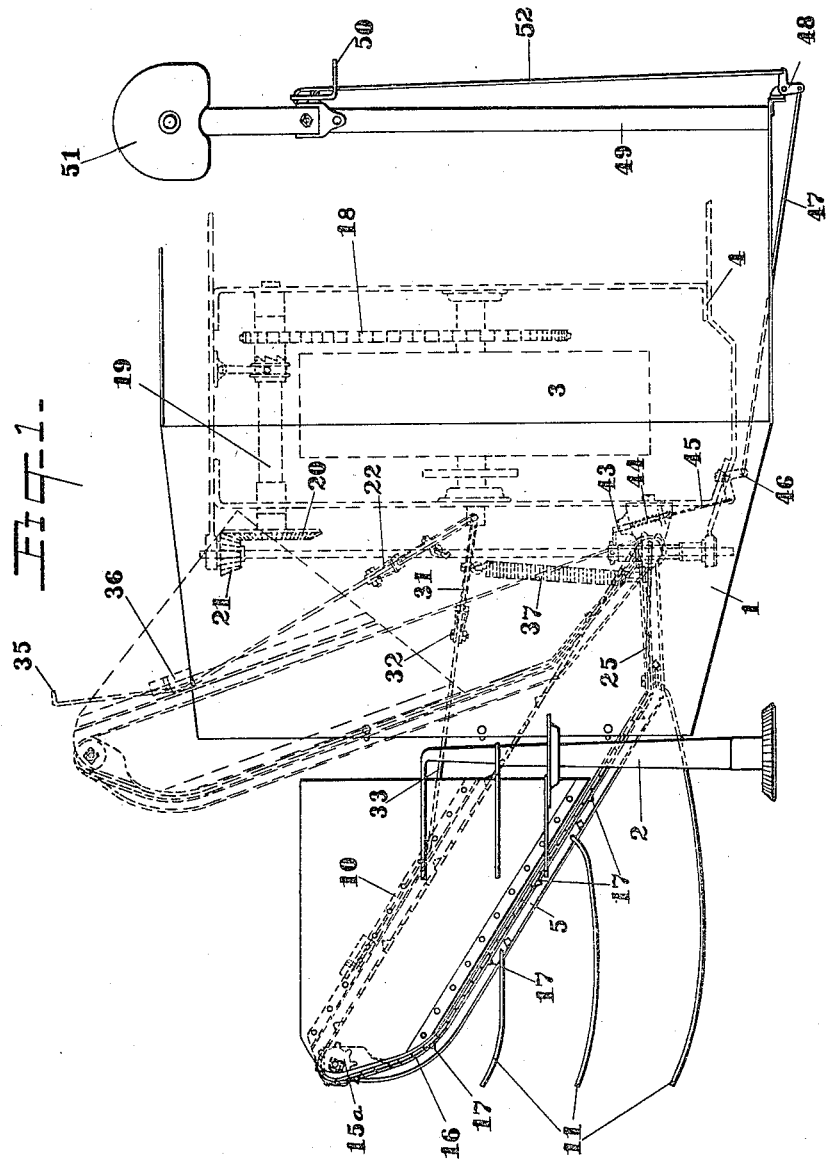

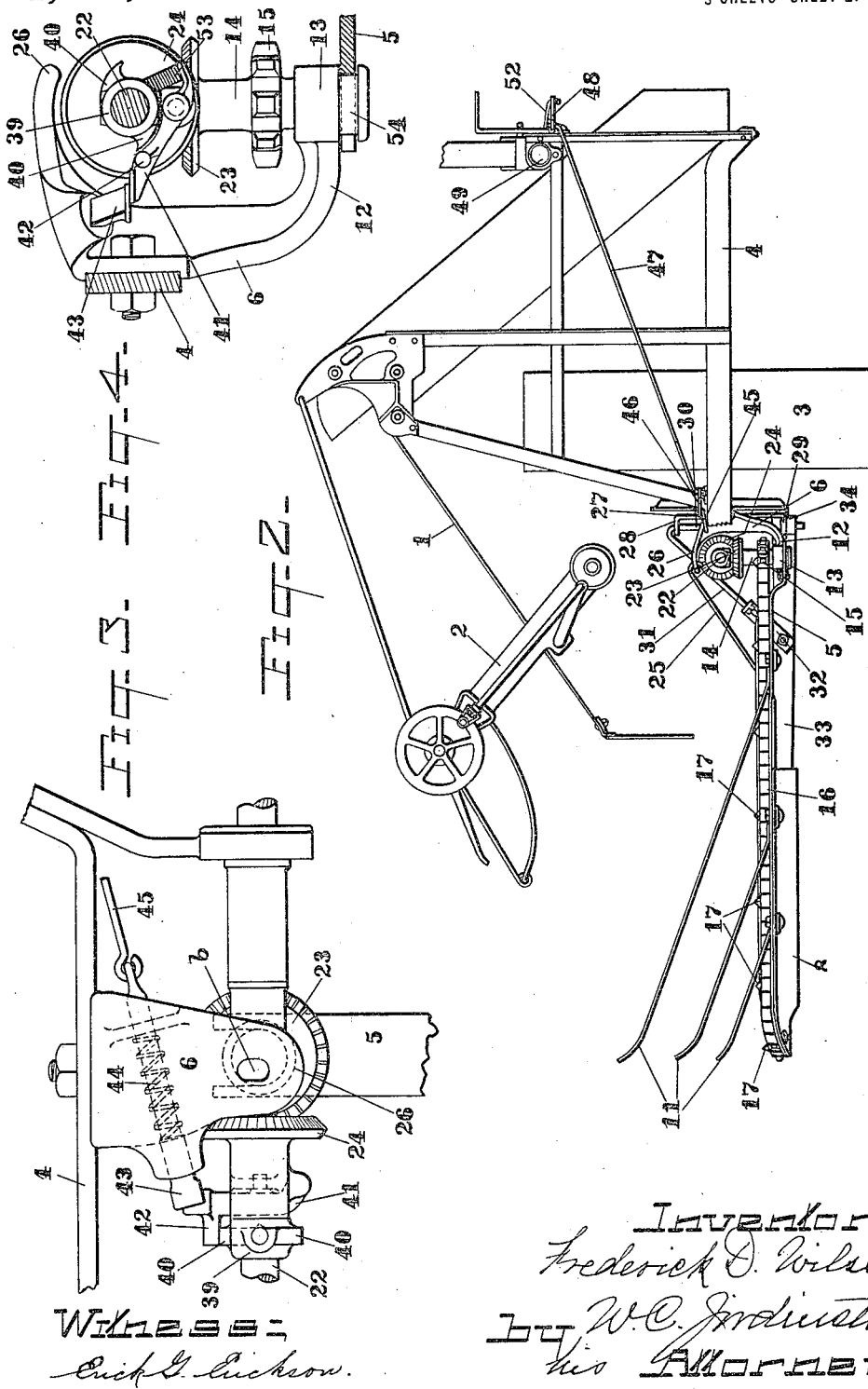

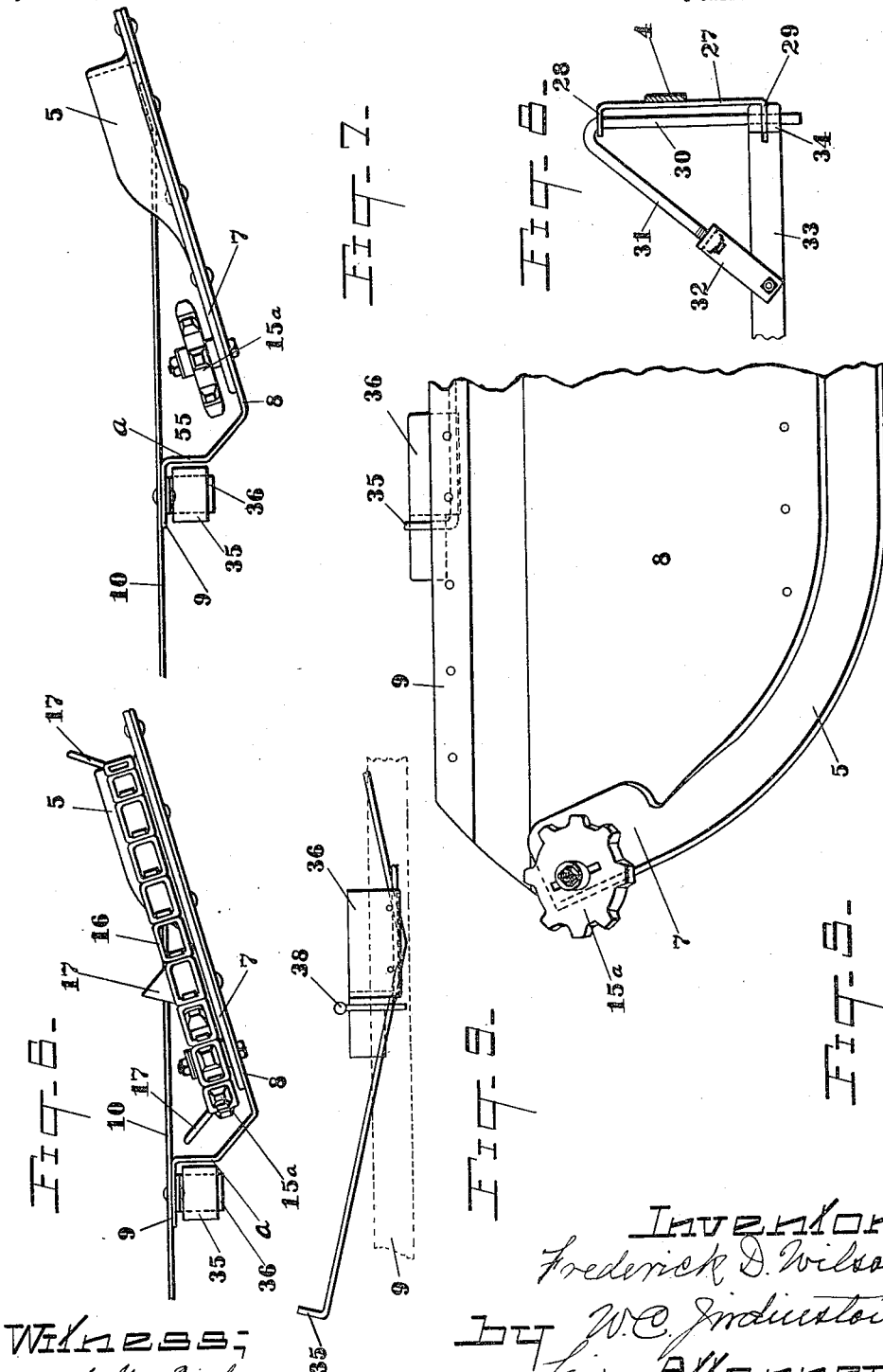

UNITED STATES PATENT OFFICE.

FREDERICK D. WILSON, OF MOLINE, ILLINOIS, ASSIGNOR TO DEERE AND COMPANY, OF MOLINE, ILLINOIS, A CORPORATION OF ILLINOIS.

SHEAF-CARRIER.

1,281,464.      Specification of Letters Patent.     Patented Oct. 15, 1918.

Application filed December 5, 1916. Serial No. 135,185.

*To all whom it may concern:*

Be it known that I, FREDERICK D. WILSON, a citizen of the United States, residing at Moline, in the county of Rock Island and State of Illinois, have invented certain new and useful Improvements in Sheaf-Carriers, of which the following is a specification, reference being had therein to the accompanying drawing.

My invention relates to bundle or sheaf carriers commonly employed on grain harvesters and binders to receive the bundle, after it is bound and ejected from the binder, and deposit it on the ground. The object of my invention is the production of a carrier operative to receive one or more bundles and deposit them on the ground stubbleward with a minimum loss of grain, the carrier being in a continuous receptive position, when the harvester is in operation, and the bundles discharged therefrom by means actuated by power transmitted from the operating power of the harvester; the carrier being readily swung toward the harvester for purposes set forth in the following specification.

Referring to the drawings in which similar numerals indicate identical parts—

Figure 1 is a plan view of the stubbleward end of a harvester and binder with my device attached.

Fig. 2 is a front elevation of Fig. 1.

Fig. 3 is an enlarged detail in plan of the clutch mechanism.

Fig. 4 is a rear elevation of Fig. 3.

Fig. 5 is an enlarged plan view of the stubbleward end of the carrier with the table removed.

Fig. 6 is an enlarged detail end view of the carrier.

Fig. 7 is a view similar to Fig. 6 but with the chain removed.

Fig. 8 is a detail of one of the supports, and

Fig. 9 is an enlarged detail.

In the drawings, which show sufficient of the stubbleward end of a harvester and binder to illustrate the application of my invention, 1 is the binder deck and 2 part of a binding mechanism, the latter being actuated, in a manner well known in the art, by power from a bull wheel 3 on which the frame 4 is supported. My device comprises an arm 5, formed of angle steel preferably, and pivotally supported on a bracket 6 secured on the frame 4. From its pivot on the bracket 6 for a portion of its length the arm 5 is approximately parallel with the front of the harvester, and from the termination of this portion it extends rearward and stubbleward having its outer end curved directly rearward and flattened to form a base 7.

The arm 5 has a rearward downward tilt, as shown more clearly in Figs. 6 and 7, and riveted or otherwise secured to the horizontal flange thereof is a metallic sheet 8 extending downward and rearward to the end of the arm 5 where it is bent upward with a rearward inclination to a vertical portion *a* which terminates in a horizontal flange 9 substantially parallel with the arm 5. A platform or table 10 is riveted preferably to the flange 9 and also to the sheet 8 rearward of the arm 5. A series of fingers 11 is secured to the arm 5 and projects therefrom upward and stubbleward, forming, with the table 10, a receiver upon which the bundles are held until it is desired to deposit them upon the ground.

The bracket 6, as stated, is mounted on the frame, 4, and has, extending stubbleward, an arm 12 having a bearing 13 in which is journaled a vertical stub shaft 14 having thereon, and revoluble therewith, a sprocket 15; the arm 5 is pivotally supported on the stub shaft 14 below the bearing 13, and on the base 7 on the opposite end of the arm 5 is a sprocket 15$^a$. Leading around both sprockets is a chain 16 provided with fingers 17 which project above the arm 5 and are adapted to engage with the bundles received from the binder. The vertical flange of the angle steel arm 5 and the horizontal flange thereof forms a way over which the chain 16 travels, the latter being at a tension sufficient to retain it in operative position at all times.

Power to actuate the sprockets 15 and 15$^a$, and consequently the chain 16, is transmitted from the bull wheel 3 of the harvester by means of a chain 18 leading over a sprocket on the bull wheel axle and a sprocket on a shaft 19 suitably journaled in bearings on the frame 4; a bevel gear 20 on the shaft 19 meshes with a bevel pinion 21 secured to a shaft 22, the latter supported in bearings on the frame 4. On the upper end of the stub shaft 14 is a bevel pinion 23 which meshes with a similar pinion 24 loosely mounted on the shaft 22. This manner of transmitting power from the bull wheel is common to harvesters and no claim is made to it.

A brace 25 is secured to the arm 5 and extends upwardly toward the harvester, its upper end having a hook which engages with a perforation b in a projecting portion 26 of the bracket 6.

The carrier is held in a receptive position in the following manner: Secured on the frame 4 is a bracket 27 with outwardly projecting arms 28 and 29 which are perforated to provide bearings for one limb 30 of an inverted V-shaped brace the other limb 31 of which is secured at its extremity to a forked member 32. A bar 33 has one end bent to an eye 34 which is slotted to permit the reception of the arm 29 of the bracket 27; the limb 30 of the V-shaped brace passes through the eye 34 to hold the bar 33 in place and form the pivot upon which it swings.

When the carrier is in a receptive position, as shown in Fig. 1, the bar 33 extends stubbleward, with a rearward inclination, until it contacts with the vertical portion a of the sheet 8, and it then extends parallel to the portion a and has its end 35 bent rearward to engage with a stop 36 to limit the swing of the carrier forwardly, the bar 33 moving between the stop 36, secured on the flange 9, and the vertical portion a of the sheet 8. A coiled spring 37 is connected to the bar 33 and the arm 5 and exerts its tension to hold the carrier in a receptive position, and also to return the carrier to a receptive position from a folded position, as shown in Fig. 1, where it is illustrated in dotted lines, manually folded rearwardly toward the harvester, and beneath the binding mechanism thereof, for purposes of transportation, the carrier pivoting on the stub shaft 14 and the projecting portion 26 of the bracket 6 and being retained in a folded position by a pin 38 which can be inserted in a perforation in the bar 33 so as to contact with the stop 36, for as the carrier swings rearwardly the bar 33 also swings at the same time, pivoting on the bracket 27, and sliding between the stop 36 and the portion a of the sheet 8.

The carrier is operated by power from the bull wheel, 3 as previously explained, and at the will of the operator, through a clutch having a member 39 fixed to the shaft 22, which is constantly rotating when the harvester is in operation, to constantly revolve therewith, and provided with lugs 40. Pivotally mounted intermediate its length on the hub of the bevel pinion 24 is a dog 41 having a finger 42 adapted to engage with either of the lugs 40, but held out of engagement therewith by a dog 43, slidably mounted on the bracket 6, and held normally in engagement with the dog 41 by a coil spring 44. A rod 45 is connected to the forward end of the dog 43 and to an arm of a bell crank 46 pivotally mounted on the frame 4. A rod 47 extends from the other arm of the bell crank 46 to an arm of a bell crank 48 pivotally mounted on the seat bar 49; a lever 50, on the seat bar 49 and adjacent the seat 51, is connected to the other arm of the bell crank 48 by a rod 52.

It will be readily understood that by rocking the lever 50 the dog 43 will be withdrawn from engagement with the dog 41, when it is desired to actuate the carrier to discharge bundles therefrom, and a coil spring 53, operating against the opposite end of the dog 41 and the hub of the pinion 24, will rock the dog 41 on its pivot so that the finger 42 will be caught by one of the lugs 40 on the constantly rotating member 39 and the pinion 24 will be rotated to actuate the pinion 23 imparting motion to the chain 16 through the sprocket 15. When the lever 52 is released the pressure of the spring 44 will move the dog 43 in the path of the dog 41 so as to engage with the latter and cause it to rock on its pivot and disengage the finger 42 from the lug 40, and consequently holding the pinion 24 against rotation and stopping the action of the chain 16. I do not limit myself to the use of the clutch mechanism just described as any one of a variety of clutches can be employed for the same purpose.

The bearing 13, on the bracket 6, has a circumferential groove 54 and the inner end of the arm 5 is flattened and bifurcated to fit therein, the weight of the carrier and the brace 25 holding the carrier in place; by this construction it will be seen that by unhooking the brace from the upper projecting portion 26 of the bracket 6 the arm 5 can be readily disengaged from its pivotal support and the carrier removed from the harvester, and lifted away from the bar 33, the latter being adapted to be swung, on its pivot on the bracket 27, toward the harvester frame, and secured thereto in any desired manner.

As the bundles are discharged from the binder they fall upon the table 10 and fingers 11, and across the chain 16 which extends diagonally of the carrier in a stubbleward and rearward direction. When the desired number of bundles has accumulated on the carrier, the clutch is thrown in and the chain 16 is at once actuated, the fingers 17 thereupon penetrating the bundles and moving them stubbleward and rearwardly to the side of the carrier where they are deposited upon the ground. The chain 16 leads around the sprocket 15ª and through a chamber 55 between the table 10 and the sheet 8, so that as the chain travels toward the sprocket 15 danger of clogging from loose straw or weeds is eliminated.

Power driven sheaf carriers to deliver bundles upon the ground and operating in a direction directly rearward or stubbleward are well known in the art, but they cannot be folded or swung out of the way when not in operation or when the harvester is traveling a narrow road or passing through a gateway. Applicant has presented a carrier in which the bundles are discharged by power and which can be swung back out of operative position, and as readily swung back into operative position without disconnecting any of the parts. It is economical in construction and operation, and supplies a demand which has not heretofore been met by power operated carriers.

What I claim is—

1. A sheaf carrier for grain harvesters pivotally supported on the harvester and including a receiving table for bundles, and a conveyer actuable by power from the harvester and operating diagonally stubbleward and rearward to remove bundles from the carrier and deposit them upon the ground.

2. A sheaf carrier for grain harvesters pivotally supported on the harvester and including a receiving table for bundles, and a conveyer actuable by power from the harvester and operating diagonally stubbleward and rearward to remove bundles from the carrier and deposit them upon the ground, said carrier adapted to be swung on its support to an inoperative position.

3. A sheaf carrier for grain harvesters pivotally supported on the harvester and including a receiving table for bundles, and a chain conveyer actuable by power from the harvester and operating diagonally stubbleward and rearward to remove bundles from the carrier and deposit them upon the ground, said carrier adapted to be swung on its support to an inoperative position.

4. A sheaf carrier for grain harvesters pivotally supported on the harvester and including a receiving table for bundles, and a chain conveyer actuable by power from the harvester and operating diagonally stubbleward and rearward to remove bundles from the carrier and deposit them upon the ground, and a chamber below said table through which said conveyer travels in a reverse direction.

5. A sheaf carrier for grain harvesters pivotally supported on the harvester and including a receiving table having a series of fingers secured to its forward end and extending stubbleward, and a chain conveyer actuable by power from the harvester and operating diagonally stubbleward and rearward between said table and fingers to remove bundles therefrom and deposit them upon the ground.

6. A sheaf carrier for grain harvesters pivotally supported on the harvester and including a receiving table for bundles, a way extending stubbleward and rearward on the forward portion of said table, a series of fingers secured to said forward portion and projecting stubbleward, and a chain conveyer adapted to travel over said way by power from the harvester to remove bundles from the carrier and deposit them upon the ground.

In testimony whereof I affix my signature, in presence of two witnesses.

FREDERICK D. WILSON.

Witnesses:
JESSIE SIMSER,
W. G. DUFFIELD.

Copies of this patent may be obtained for five cents each, by addressing the "Commissioner of Patents, Washington, D. C."